July 24, 1934. T. V. BUCKWALTER 1,967,805
RAILWAY TRUCK CONSTRUCTION
Filed June 16, 1932 2 Sheets-Sheet 2
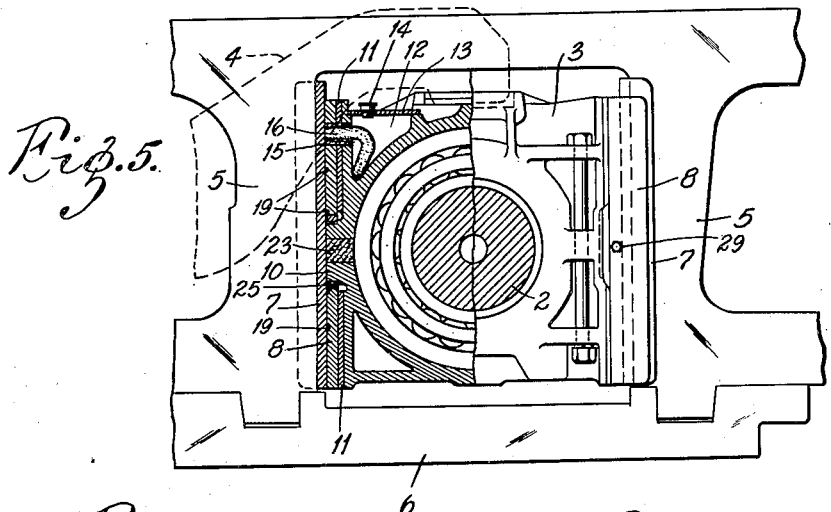
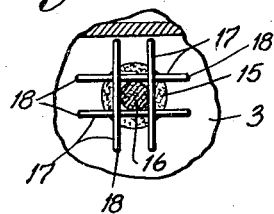
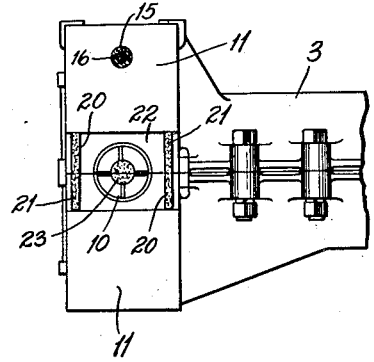
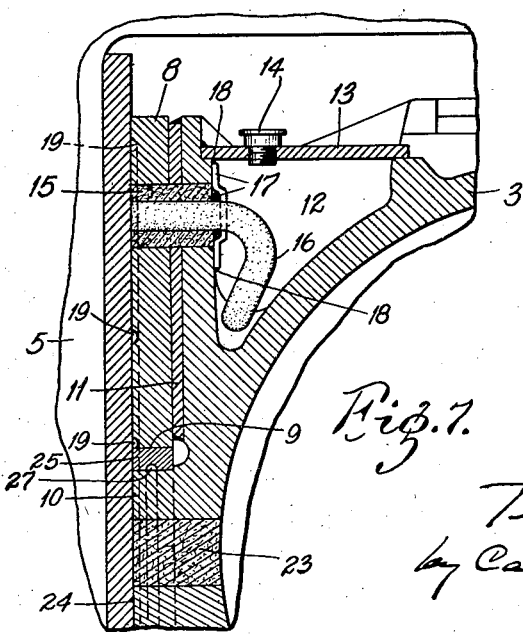
INVENTOR:
Tracy V. Buckwalter
HIS ATTORNEYS Patented July 24, 1934

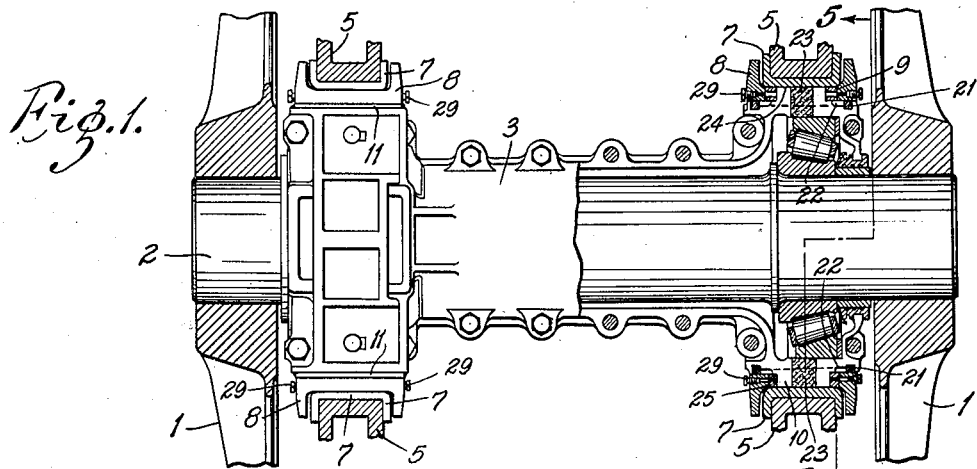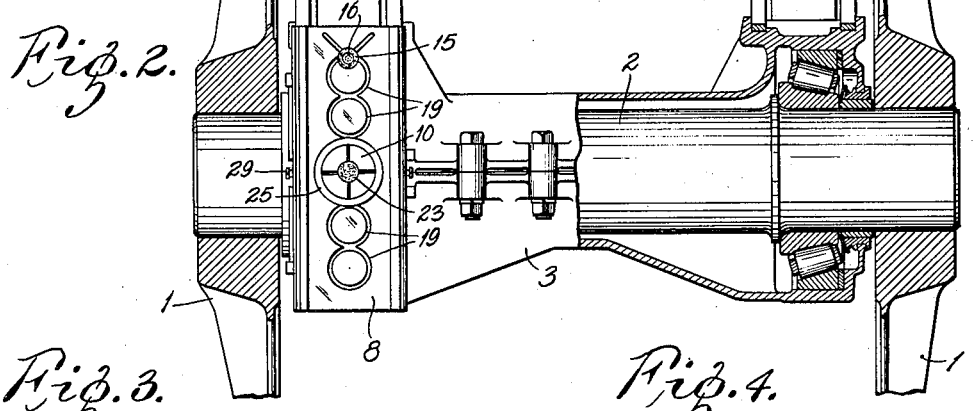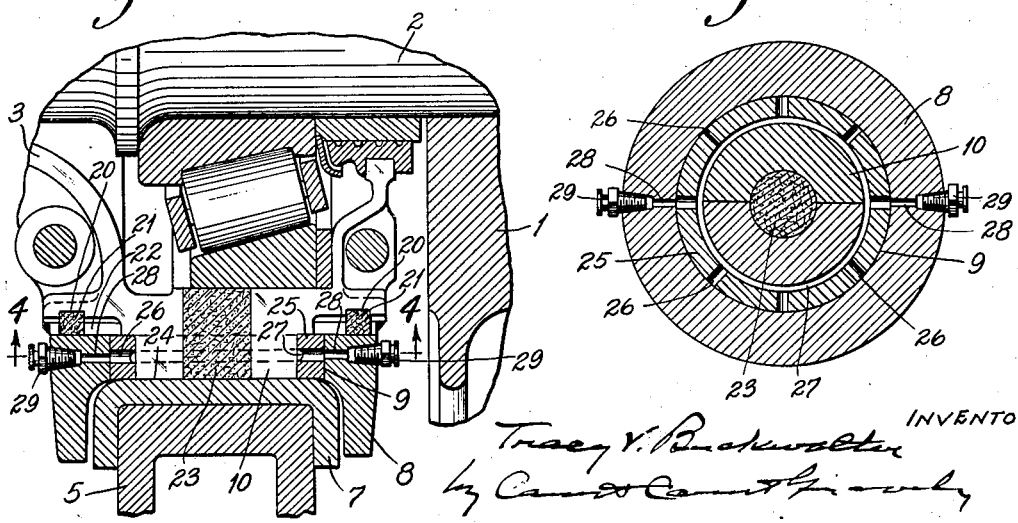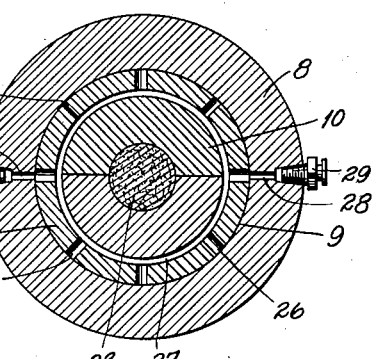

1,967,805

UNITED STATES PATENT OFFICE 1,967,805

RAILWAY TRUCK CONSTRUCTION

Tracy V. Buckwalter, Canton, Ohio, assignor to The Timken Roller Bearing Company, Canton, Ohio, a corporation of Ohio Application June 16, 1932, Serial No. 617,574

9 Claims. (Cl. 295—36)

My invention relates to railway trucks, particularly to the type of railway truck disclosed in Buckwalter Patent No. 1,722,035, wherein the axle housing has trunnions extending laterally therefrom and projecting into trunnion guides which are mounted for vertical sliding movement along the truck frame pedestals. The principal object of this invention is to provide simple means in a truck of this type for continuously lubricating the wear surfaces of the axle housing, the trunnion guides, and the frame pedestal members.

The invention consists principally in a railway truck having a lubricant reservoir formed in the top of its axle housing and having a wick of absorbent material extending through the wall of the reservoir and through the trunnion guide and engaging the frame pedestal liner for drawing lubricant from the reservoir and distributing it to the wear surfaces of the axle housing, the trunnion guide, and the frame pedestal liner. The invention further consists in employing a plug of absorbent material extending through the axle housing trunnion for carrying lubricant splashed on the plug by the bearings to the space between the trunnion end and the frame pedestal liner. The invention also consists in the combinations and arrangements of parts hereinafter described and claimed.

In the accompanying drawings which form part of this specification and wherein reference numerals refer to like parts wherever they occur, Fig. 1 is a horizontal sectional view taken through the middle of an axle housing assembly mounted in a truck frame in a manner conforming to my invention with one half of the axle housing assembly being shown in plan, Fig. 2 is a vertical sectional view taken through the middle of the construction disclosed in Fig. 1 with one half of the axle housing assembly being shown in elevation, Fig. 3 is an enlarged fragmentary view of the lower right-hand portion of Fig. 1, showing the construction of the axle housing trunnion and its related parts, Fig. 4 is a vertical sectional view along the line 4—4 in Fig. 3, Fig. 5 is a vertical sectional view along the line 5—5 in Fig. 1, Fig. 6 is a side elevation of an end portion of the axle housing, Fig. 7 is a transverse, vertical sectional view through the lubricant reservoir in the top of the axle housing, and Fig. 8 is a fragmentary view looking at the wall of the lubricant reservoir from the inside and showing the manner of holding the lubricant wick in place.

In the drawings, I have shown my invention embodied in a railway truck of the type disclosed in Buckwalter Patent No. 1,722,035. In this construction, the wheels 1 are rigidly secured to the axle 2, which is located inside of a housing 3, with roller bearings interposed between the axle and the housing; and the top of each end portion of the housing is provided with seats for equalizer members 4.

The frame has downwardly extending pedestals 5 extending on opposite sides of the axle housing, and the bottoms thereof are connected by a pedestal tie member 6. Mounted around each pedestal is a channel-shaped liner 7, and mounted around the liner is a channel-shaped guide block 8 with a circular opening 9 therethrough for receiving a horizontal circular trunnion 10 extending laterally from the side of the axle housing. In the constructions shown, rectangular, flat, trunnion wear pads 11 are interposed between the housing and the trunnion guide above and below the trunnion and are welded to the housing.

The top of each side of the axle housing near each end opposite the frame pedestal is shaped to form a lubricant reservoir 12. The reservoir is closed at its top by a cover plate 13 which has an opening therethrough for filling the reservoir with lubricant; and this opening is provided with a movable plug 14 for closing it after the reservoir is filled. The upper portion of each trunnion guide 8 has an opening therethrough in alignment with an opening through the upper trunnion wear pad and an opening through the axle housing which communicates with the lubricant reservoir 12; and mounted within these openings is a tube 15 of felt, or like material, having a round lubricant wick 16 extending through the bore of the tube. The tube 15 and wick 16 are held in place by four cross-wires 17 secured to the inner wall of the lubricant reservoir 12 as by welding 18. The outer ends of the wick and tube engage the face of the pedestal liner; and the wick, which is considerably longer than the tube, has its inner end depending into the bottom of the lubricant reservoir for absorbing and drawing lubricant therefrom and supplying it to the contacting wear faces of the trunnion wear pad, the guide block, and the pedestal liner. The face of the trunnion guide contacting with the pedestal liner has a series of circular grooves 19 communicating with the wick hole and with each other for distributing lubricant from the wick over the entire face of the guide block.

The axle housing on each side of the trunnion has a vertically disposed groove 20 therein extending between the upper and lower trunnion wear pads 11, and rectangular strips 21 of felt, or like material, are laid in these grooves with their outer faces engaging the face of the trunnion guide. These felt strips act as enclosure members at the ends of the relieved portion of the axle housing surrounding the trunnion and form a lubricant reservoir 22 for gathering lubricant from between the wear surfaces above the trunnion and then feeding it to the wear surfaces below the trunnion. Each axle housing trunnion 10 has a central opening therethrough; and disposed within the opening is a plug 23 of felt, or like material, having its outer end engaging the wear face of the pedestal liner for carrying lubricant splashed on its inner end by the bearings to the space 24 between the trunnion end and the wear face of the pedestal liner.

In order to thoroughly lubricate the trunnion surface and the wall of the trunnion opening in the trunnion guide, a novel wear ring 25 having radial openings 26 therethrough connected by a circumferential groove in its inner periphery 27, is shrunk on the trunnion; and the trunnion guide has a hole 28 in each side which registers with these radial openings through the wear ring. The holes 28 on the trunnion guide are closed by removable plugs 29 which may be taken out so that alemite devices may be fitted in the holes for forcing lubricant around the trunnion wear ring and the wall of the trunnion opening in the trunnion guide.

In the operation of a railway truck of the type hereinabove shown and described, the axle housing is continually oscillating with respect to the trunnion guide due to track irregularities and the like causing the axle to tilt endwise. This oscillating movement of the axle housing tends to shear the upper felt tube and wick slightly which squeezes the lubricant therefrom, which has been drawn from the lubricant reservoir by the wick; and the lubricant, which is squeezed from the wick and tube seeps down between the wear faces of the trunnion pad and trunnion guide and into the distributing grooves of the guide block to thoroughly lubricate the entire wear faces thereof.

Furthermore, when the truck is in operation, the bearings upon rotating carry lubricant from the bottom of the bearing chamber and splash it in the inner end of the felt plug extending through the trunnion, and the lubricant splashed on the plug is carried thereby to the space between the trunnion end and the wear face of the pedestal liner to help lubricate the wear surfaces of the trunnion and its related parts.

Obviously, the construction hereinabove described admits of considerable variation without departing from the spirit of my invention. Accordingly, I do not wish to be limited to the precise construction shown and described.

What I claim is:

1. The combination of a truck side frame having an opening therein, an axle housing movably mounted in said opening and having a portion thereof shaped to form a lubricant reservoir, a piece of absorbent material extending through the wall of said reservoir and engaging the truck side frame for drawing lubricant from said reservoir and delivering it to the wear surfaces at the side of said frame opening and the axle housing and means associated with said axle housing and capable of movement relative thereto, thereby by squeezing said absorbent material to deliver lubricant.

2. The combination of a truck side frame having an opening therein defined by pedestals, an axle housing mounted in said opening and having a lubricant reservoir in its top and having a trunnion extending therefrom adjacent to one of the pedestals, a guide block for said pedestal having an opening for receiving said trunnion, and a piece of absorbent material extending through said guide block and communicating with said lubricant reservoir for drawing lubricant therefrom and delivering it to the wear surfaces of the pedestal, the guide block, and the axle housing.

3. The combination of a truck side frame having an opening therein defined by pedestals, an axle housing mounted in said opening and having a lubricant reservoir in its top and having a trunnion extending therefrom adjacent to one of the pedestals, wear plates fixed to the sides of said housing above and below said trunnion, respectively, said housing having grooves in its side extending between the upper and lower wear plates on each side of said trunnion, respectively, a guide block fitted around said pedestal for vertical sliding movement thereon and having an opening for receiving said trunnion, a piece of absorbent material extending through the guide block and the upper wear plate and the wall of said reservoir, and strips of sealing material laid in the grooves in the side of the axle housing and having their outer sides engaging the wear surfaces of the pedestal.

4. The combination of a truck side frame having an opening therein, an axle housing having a trunnion mounted in said opening, said axle housing having a lubricant reservoir in its top, a guide block slidable along the wall of said frame opening and having an opening for receiving said trunnion, a tube of absorbent material extending through the guide block and the wall of said reservoir, and a lubricant wick extending through the bore of said tube with its inner end depending into said lubricant reservoir and its outer end engaging the wall of said frame opening.

5. The combination of a truck side frame having an opening therein, an axle housing having a trunnion mounted in said opening, said axle housing having a lubricant reservoir in its top, a guide block fitted around the wall of said frame opening and having an opening for receiving said trunnion, and a wick extending through the guide block and the wall of said reservoir, said guide block having grooves in its wear surface facing the wall of the frame opening for distributing lubricant received from the wick over such surface.

6. The combination of a truck side frame having an opening therein, an axle housing mounted in said opening, a piece of absorbent material extending through the housing and engaging the wall of the side frame opening for drawing lubricant from said housing and delivering it to the wear surface at the side of the axle housing and means associated with said axle housing and capable of movement relative thereto, thereby squeezing said absorbent material to deliver lubricant.

7. The combination of a truck side frame having an opening therein, an axle housing mounted in said opening and having a trunnion with a longitudinal opening therethrough, and a piece of absorbent material disposed in the opening through the trunnion for drawing oil from the inside of the axle housing and delivering it to the wear surfaces at the end of the trunnion.

8. In a railway truck, the combination of an axle housing having a trunnion, a wear ring having a series of radial openings connected by a circumferential groove in its inner periphery fixed on said trunnion, and a member having an opening for receiving said trunnion, said member having a hole in its side communicating with the trunnion opening in position to register with said radially disposed openings through the trunnion wear ring.

9. The combination of a truck side frame having an opening therein defined by pedestals, an axle housing in said frame opening having a trunnion with a longitudinal hole therethrough, said housing having a lubricant reservoir in its top, flat wear plates secured to the side of said housing above and below said trunnion, respectively, said housing having vertically disposed grooves in its side extending between the upper and lower wear plates on each side of said trunnion, respectively, a wear ring having a series of radially disposed openings connected by a circumferential groove in its inner periphery fixed on said trunnion, a channel-shaped guide block fitted around one of said pedestals for vertical sliding movement with respect thereto and having an opening for receiving the axle housing trunnion, said guide block having a hole in its side communicating with said trunnion receiving opening in position to register with said radially disposed openings through the trunnion wear ring, a tube of absorbent material extending through the guide block and the upper wear plate and the wall of the lubricant reservoir, a lubricant wick extending through the bore of said tube with its inner end depending into the bottom of said lubricant reservoir and its outer end engaging the wear surface of the pedestal, strips of sealing material disposed in the vertically disposed grooves in the side of said axle housing with their outer faces engaging the wear surface of the pedestal, and a plug of absorbent material disposed in the hole through the trunnion.

TRACY V. BUCKWALTER.